(12) United States Patent
Yamaguchi et al.

(10) Patent No.: US 12,546,023 B2
(45) Date of Patent: Feb. 10, 2026

(54) ALUMINUM MEMBER AND METHOD FOR PRODUCING SAME

(71) Applicant: NIPPON LIGHT METAL COMPANY, LTD., Tokyo (JP)

(72) Inventors: Takayuki Yamaguchi, Shizuoka (JP); Yoshihiro Taguchi, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 273 days.

(21) Appl. No.: 18/032,802

(22) PCT Filed: Oct. 14, 2021

(86) PCT No.: PCT/JP2021/037995
§ 371 (c)(1),
(2) Date: Apr. 19, 2023

(87) PCT Pub. No.: WO2022/085548
PCT Pub. Date: Apr. 28, 2022

(65) Prior Publication Data
US 2024/0035187 A1 Feb. 1, 2024

(30) Foreign Application Priority Data
Oct. 23, 2020 (JP) .................. 2020-178051

(51) Int. Cl.
*C25D 11/08* (2006.01)
*C25D 11/16* (2006.01)

(52) U.S. Cl.
CPC .............. *C25D 11/08* (2013.01); *C25D 11/16* (2013.01)

(58) Field of Classification Search
None
See application file for complete search history.

(56) References Cited

U.S. PATENT DOCUMENTS

2020/0299811 A1 9/2020 Seki et al.

FOREIGN PATENT DOCUMENTS

| EP | 2575145 | 4/2013 |
|----|---------|--------|
| JP | 2013076118 | 4/2013 |

(Continued)

OTHER PUBLICATIONS

Ono, S., Aluminum Member, Apr. 20, 2017, machine translation of JP2017-075383 (Year: 2017).*

(Continued)

*Primary Examiner* — Chinessa T. Golden
(74) *Attorney, Agent, or Firm* — JCIPRNET

(57) ABSTRACT

Provided is an aluminum member including: a substrate formed of aluminum or an aluminum alloy. The aluminum member includes an anodic oxide coating that includes a barrier layer in contact with a surface of the substrate, a first porous layer in contact with a surface of the barrier layer on an opposite side to the substrate, and a second porous layer in contact with a surface of the first porous layer on an opposite side to the barrier layer and including multiple pores aligned and linearly extending from a surface in contact with the first porous layer toward an exposed surface. The first porous layer includes at least one of: multiple branching pores; or multiple pores having an average pore diameter larger than that of the second porous layer.

12 Claims, 9 Drawing Sheets

(56) References Cited

FOREIGN PATENT DOCUMENTS

| JP | 2017025384 | | 2/2017 | |
|----|------------|---|--------|---|
| JP | 2017075383 | | 4/2017 | |
| JP | 2017075383 A | * | 4/2017 | |
| JP | 2018090897 | | 6/2018 | |
| JP | 2019039060 | | 3/2019 | |
| JP | 2019039060 A | * | 3/2019 | ............... B24C 1/08 |
| JP | 6525035 | | 6/2019 | |

OTHER PUBLICATIONS

Seki, Y., Aluminum Member, Mar. 14, 2019, machine translation of JP2019-039060 (Year: 2019).*

"International Search Report (Form PCT/ISA/210) of PCT/JP2021/037995", mailed on Nov. 22, 2021, with English translation thereof, pp. 1-4.

* cited by examiner

ANODIC OXIDE COATING

SUBSTRATE

SECOND POROUS LAYER

FIRST POROUS LAYER

BARRIER LAYER

SUBSTRATE

ANODIC OXIDE COATING

SUBSTRATE

POROUS LAYER

BARRIER LAYER

SUBSTRATE

ALUMINUM MEMBER AND METHOD FOR PRODUCING SAME

CROSS-REFERENCE TO RELATED APPLICATION

This application is a 371 application of the international PCT application serial no. PCT/JP2021/037995, filed on Oct. 14, 2021, which claims the priority benefit of Japan application serial no. 2020-178051, filed on Oct. 23, 2020. The entirety of each of the above-mentioned patent applications is hereby incorporated by reference herein and made a part of this specification.

TECHNICAL FIELD

The present invention relates to aluminum members and methods for producing the same.

BACKGROUND ART

In recent years, there has been an increasing demand for casings having an appearance as white as paper, for example, for portable devices and personal computers. To meet such a demand, attempts have been made to make the appearance of an aluminum member white by forming an anodic oxide coating on the surface of a substrate formed of aluminum or an aluminum alloy.

Patent Literature 1 discloses an aluminum member where the surface of a substrate has an arithmetical mean height Sa of 0.1 to 0.5 μm, a maximum height Sz of 0.2 to 5 μm, and a mean width of roughness profile elements RSm of 0.5 to 10 μm.

CITATION LIST

Patent Literature

Patent Literature 1: Japanese Patent No. 6525035

SUMMARY OF INVENTION

Based on the aluminum member of Patent Literature 1, an aluminum member having a white appearance is obtained by setting the arithmetical mean height Sa, the maximum height Sz, and the mean width of roughness profile elements RSm of the substrate within predetermined ranges. However, there is a demand for an aluminum member that has improved whiteness when viewed obliquely and has an appearance closer to paper.

The present disclosure has been made in light of such issues of the conventional technology. Hence, an object of the present disclosure is to provide an aluminum member having a white color and low angular dependence, and a method for producing the same.

An aluminum member according to a first aspect of the present disclosure includes a substrate formed of aluminum or an aluminum alloy. The aluminum member includes an anodic oxide coating that includes a barrier layer in contact with a surface of the substrate, a first porous layer in contact with a surface of the barrier layer on an opposite side to the substrate, and a second porous layer in contact with a surface of the first porous layer on an opposite side to the barrier layer and including multiple pores aligned and linearly extending from a surface in contact with the first porous layer toward an exposed surface. The first porous layer includes at least one of multiple branching pores, or multiple pores having an average pore diameter larger than that of the second porous layer.

A method for producing an aluminum member according to a second aspect of the present disclosure includes performing a first anodization on a substrate formed by aluminum or an aluminum alloy using an electrolytic solution that is capable of forming multiple pores aligned and extending linearly. The above method includes performing a second anodization on the substrate that has been subjected to the first anodization using an electrolytic solution. The electrolytic solution for the second anodization is capable of forming at least one of multiple branching pores, or multiple pores having an average pore diameter larger than that of the multiple pores linearly extending.

The present disclosure provides an aluminum member having a white color and low angular dependence, and a method for producing the same.

DESCRIPTION OF EMBODIMENTS

Figure 1:
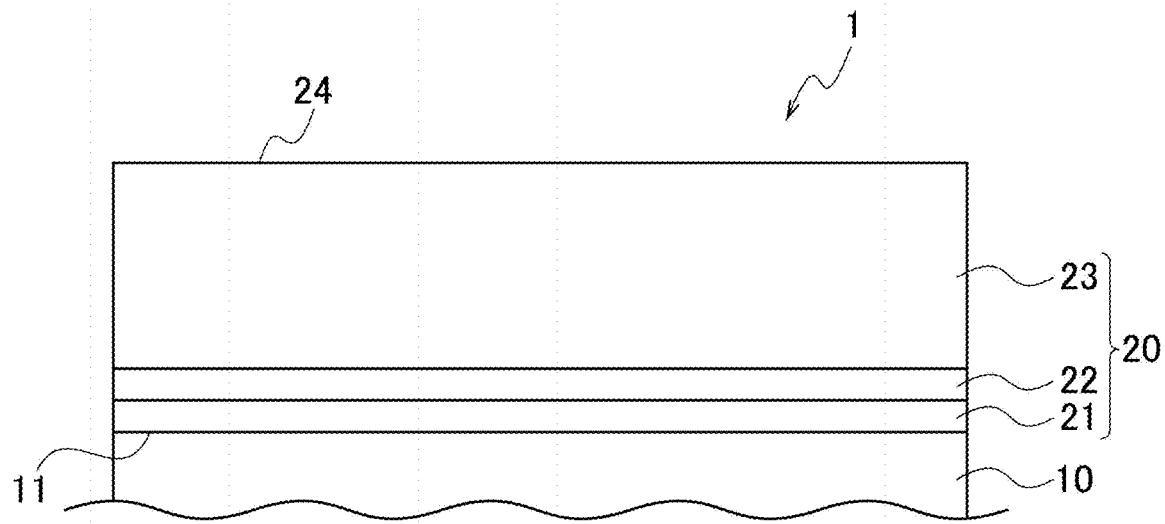
FIG. 1 is a cross-sectional diagram illustrating an example of an aluminum member according to the present embodiment.

Hereinafter, an aluminum member and a method for producing the aluminum member according to the present embodiment will be described in detail using the drawings. Note that the dimensional ratios in the drawings are exaggerated for convenience of explanation and they may be different from the actual ones.

[Aluminum Member]

As illustrated in FIG. 1, an aluminum member 1 of the present embodiment includes a substrate 10 and an anodic oxide coating 20. These constituents will be described in the following.

(Substrate 10)

Substrate 10 is formed of aluminum or an aluminum alloy. The substrate 10 may be formed of, for example, a 1000 series alloy, a 3000 series alloy, a 5000 series alloy, a 6000 series alloy, or a 7000 series alloy. The substrate 10 may be formed of aluminum or an aluminum alloy that contains 0 to 10% by mass of magnesium, 0.1% by mass or less of iron, 0.1% by mass or less of silicon, and a balance of aluminum and unavoidable impurities. The substrate 10 may be formed of aluminum or an aluminum alloy that contains 0 to 10% by mass of magnesium, 0.1% by mass or less of iron, 0.1% by mass or less of silicon, 10% by mass or less of zinc, and a balance of aluminum and unavoidable impurities.

Magnesium does not necessarily need to be contained in the substrate 10, but magnesium contained in the substrate 10 allows aluminum and magnesium to form a solid solution, improving the strength of the substrate 10. The magnesium content of 10% by mass or less reduces the degradation in the corrosion resistance of the substrate 10 while improving the strength of the substrate 10. The magnesium content is preferably 0.5% by mass or more, and is more preferably 1% by mass or more. In addition, the magnesium content is preferably 8% by mass or less, and more preferably 5% by mass or less.

Iron and silicon are unlikely to form a solid solution with aluminum. Hence, in the case where the substrate 10 contains these elements, these elements are likely to precipitate in the anodic oxide coating 20 as a second phase containing iron or silicon. If the anodic oxide coating 20 contains a second phase as above, the second phase absorbs part of the light transmitted through the anodic oxide coating 20, and this may make the aluminum member 1 look a yellowish color. The substrate 10 preferably contains 0.05% by mass or less of iron. The substrate 10 also preferably contains 0.05% by mass or less of silicon.

Zinc does not necessarily need to be contained in the substrate 10, but zinc contained in the substrate 10 maintains the strength of the substrate 10. In addition, the zinc content of 10% by mass or less maintains the strength of the substrate 10 and also does not impair the appearance of the aluminum member 1. The zinc content is preferably 8% by mass or less.

The substrate 10 may contain unavoidable impurities. Unavoidable impurities in the present embodiment mean substances present in the raw materials or substances inevitably mixed in the production processes. Although unavoidable impurities are originally unnecessary, they are accepted because the amount is very small and they do not affect the properties of the aluminum or aluminum alloy. Examples of unavoidable impurities that may be contained in the aluminum or aluminum alloy are elements other than aluminum, magnesium, iron, and silicon. Examples of unavoidable impurities that may be contained in the aluminum or aluminum alloy include copper, manganese, chromium, zinc, titanium, gallium, boron, vanadium, zirconium, lead, calcium, and cobalt. The amount of unavoidable impurities is preferably 0.5% by mass or less in total in the aluminum or aluminum alloy, more preferably 0.2% by mass or less, further preferably 0.15% by mass or less, and particularly preferably 0.10% by mass or less. The content of each element contained as unavoidable impurities is preferably 0.05% by mass or less, more preferably 0.03% by mass or less, and still more preferably 0.01% by mass or less.

The substrate 10 may have irregularities on a surface 11 on the anodic oxide coating 20 side. The aluminum member 1 is capable of diffusely reflecting light transmitted through the anodic oxide coating 20 using the irregularities formed on the surface 11. The irregularities on the surface 11 can be formed through roughening described below. It is preferable that the surface 11 of the substrate 10 have the arithmetical mean height Sa of 0.1 to 0.5 µm, the maximum height Sz of 0.2 to 5 µm, and the mean width of roughness profile elements RSm of 0.5 to 10 µm.

The arithmetical mean height Sa of 0.1 µm or more makes light transmitted through the anodic oxide coating 20 be diffusely reflected on the surface 11 of the substrate 10, and this further enhances the whiteness of the aluminum member 1 when viewed obliquely. The arithmetical mean height Sa of 0.5 µm or less prevents light transmitted through the anodic oxide coating 20 being captured between irregularities on the surface 11 of the substrate 10, and this prevents the appearance of the aluminum member 1 from looking gray. The arithmetical mean height Sa is more preferably 0.4 µm or less. The arithmetical mean height Sa can be measured in accordance with ISO25178.

The maximum height Sz of 0.2 µm or more makes light transmitted through the anodic oxide coating 20 be diffusely reflected on the surface 11 of the substrate 10, and this further enhances the whiteness of the aluminum member 1 when viewed obliquely. The maximum height Sz of 5 µm or less prevents light transmitted through the anodic oxide coating 20 being captured between irregularities on the surface 11 of the substrate 10, and this prevents the appearance of the aluminum member 1 from looking gray. The maximum height Sz is more preferably 1 µm or more, and is more preferably 4.7 µm or less. The maximum height Sz can be measured in accordance with ISO25178.

The mean width of roughness profile elements RSm of 0.5 µm or more prevents light transmitted through the anodic oxide coating 20 being captured between irregularities on the surface 11 of the substrate 10 because the pitches of irregularities on the surface 11 of the substrate 10 are not too small. This prevents the appearance of the aluminum member 1 from looking gray. In the case where the mean width of roughness profile elements RSm is 10 µm or less, the pitches of irregularities on the surface 11 of the substrate 10 are not too large. As a result, light transmitted through the anodic oxide coating 20 is diffusely reflected on the surface 11 of the substrate 10, and the whiteness of the aluminum member 1 when viewed obliquely is further enhanced. The mean width of roughness profile elements RSm is more preferably 5 µm or more, and is more preferably 9.5 µm or less. The mean width of roughness profile elements RSm can be measured in accordance with JIS B0601:2013 (ISO4287: 1997, Amd. 1:2009).

The arithmetical mean height Sa, the maximum height Sz and the mean width of roughness profile elements RSm on the surface 11 of the substrate 10 can be measured by removing the anodic oxide coating 20 from the substrate 10. Note that because the irregularities on the surface 11 of the substrate 10 become smooth through anodic oxidation, the irregularities on the surface 11 of the substrate 10 before anodic oxidation and the irregularities on the surface 11 of the substrate 10 after anodic oxidation may be different in shape. Hence, in the present embodiment, the shape of the surface 11 of the substrate 10 is measured after the anodic oxide coating 20 is removed. The method of removing the anodic oxide coating 20 from the substrate 10 is not particularly limited. For example, in accordance with JIS H8688: 2013 (Anodizing of aluminum and its alloys—Determination of mass per unit area (surface density) of anodic oxidation coatings), the aluminum member 1 is immersed in a solution of chromic (VI) and phosphoric acid to resolve and remove the anodic oxide coating 20.

The shape and thickness of the substrate 10 are not particularly limited and may be changed as necessary depending on the purposes. The substrate 10 may be processed or subjected to heat treatment.

(Anodic Oxide Coating 20)

The anodic oxide coating 20 is provided on the surface 11 of the substrate 10. This anodic oxide coating 20 improves the corrosion resistance, wear resistance, and other characteristics. The anodic oxide coating 20 includes a barrier layer 21, a first porous layer 22, and a second porous layer 23.

The barrier layer 21 is in contact with the surface 11 of the substrate 10. The barrier layer 21 is a dense nonporous layer. The thickness of the barrier layer 21 is not limited and may be 1 nm or more, or 10 nm or more, for example. The thickness of the barrier layer 21 may be 500 nm or less, or 300 nm or less.

The barrier layer 21 contains aluminum oxide. Also, in addition to aluminum and oxygen, the barrier layer 21 may contain an element such as sulfur, carbon, sodium, potassium, phosphorus, silicon, or nitrogen as a constituent element of ammonia, each of which is derived from components of an electrolytic solution used in anodic oxidation. In the barrier layer 21 and the first porous layer 22 formed using a two-step electrolysis method where porous-type electrolytic solutions are combined, the whiteness of the aluminum member 1 is further enhanced by means of the color tone of a film itself obtained due to the electrolytic solution components and by means of the refraction of incident light.

The first porous layer 22 is in contact with the surface of the barrier layer 21 on the opposite side to the substrate 10. The first porous layer 22 may have multiple branching pores. Each pore of the first porous layer 22 may have a dendritic structure, and the first porous layer 22 may have multiple pores extending while branching from the surface of the barrier layer 21 toward the second porous layer 23. The first porous layer 22 may have linear pores extending from the surface of the barrier layer 21 toward the second porous layer 23, and pores branching from the linear pores may be provided. The average pore diameter of the multiple pores of the first porous layer 22 is in a range of 5 to 350 nm, for example. The average pore diameter of the first porous layer 22 may be 10 nm or more, or 20 nm or more. The average pore diameter of the first porous layer 22 may be 300 nm or less. The average pore diameter of the multiple pores of the first porous layer 22 may be larger than that of multiple pores of the second porous layer 23.

The thickness of the first porous layer 22 is not limited but is preferably 10 nm or more and 5000 nm or less. The thickness of the first porous layer 22 of 10 nm or more further improves the whiteness of the aluminum member 1. The thickness of the first porous layer 22 of 5000 nm or less maintains a highly white state when the anodic oxide coating 20 is formed. The thickness of the first porous layer 22 may be 50 nm or more, or 100 nm or more. The thickness of the first porous layer 22 may be 4000 nm or less, or 3500 nm or less.

The first porous layer 22 contains aluminum oxide. Also, in addition to aluminum and oxygen, the first porous layer 22 may contain: sulfuric acid, phosphoric acid, and each salt thereof; an acid containing a carboxyl group such as oxalic acid, salicylic acid, citric acid, maleic acid, or tartaric acid, and each salt thereof; and a compound such as a silicate or an ammonium salt, which are derived from an electrolytic solution for anodization. The salt includes a sodium salt and a potassium salt. When the first porous layer 22 contains an element mentioned above, the first porous layer 22 becomes white, and thus the aluminum member 1 having a higher degree of whiteness is obtained.

The second porous layer 23 is in contact with the surface of the first porous layer 22 on the opposite side to the barrier layer 21. The second porous layer 23 has multiple pores aligned and linearly extending from the surface in contact with the first porous layer 22 toward a surface 24 that is exposed. The pores of the second porous layer 23 may be connected to the pores of the first porous layer 22. The average pore diameter of the multiple pores of the second porous layer 23 is in a range of 5 to 200 nm, for example. The average pore diameter of the second porous layer 23 may be 8 nm or more, or 10 nm or more. The average pore diameter of the second porous layer 23 may be 100 nm or less, 50 nm or less, or 30 nm or less.

The thickness of the second porous layer 23 is not limited but is preferably 2 μm or more and 50 μm or less. The thickness of the second porous layer 23 of 2 μm or more suppresses an interference color of the anodic oxide coating 20 formed on the substrate 10, and this improves an L* value of the aluminum member 1. The thickness of the second porous layer 23 of 50 μm or less reduces dissolution when the anodic oxide coating 20 is formed. The thickness of the second porous layer 23 may be 5 μm or more, or 8 μm or more. The thickness of the second porous layer 23 may be 25 μm or less, or 15 μm or less.

The second porous layer 23 contains aluminum oxide. In addition to aluminum oxide, the second porous layer 23 may contain: sulfuric acid, amide sulfuric acid, phosphoric acid, and each salt thereof, an acid containing a carboxyl group such as oxalic acid, salicylic acid, citric acid, maleic acid, or tartaric acid, and each salt thereof; and a compound such as a silicate or an ammonium salt, which are derived from an electrolytic solution for anodization. The salt includes a sodium salt and a potassium salt. When the second porous layer 23 contains a compound mentioned above, the transparency of the second porous layer 23 is enhanced and the light diffused by the first porous layer 22 is easily transmitted, and thus the aluminum member 1 maintaining a highly white state is obtained.

The first porous layer 22 has at least one of multiple branching pores or multiple pores having an average pore diameter larger than that of the second porous layer 23. That is, the first porous layer 22 may have multiple branching pores, may have multiple pores having an average pore diameter larger than that of the second porous layer 23, or may have multiple branching pores having an average pore diameter larger than that of the second porous layer 23. This promotes diffused reflection in the first porous layer 22 and reduces the angular dependence of whiteness. Note that in the present description, the average pore diameter is an average value obtained by observing the cross section of the aluminum member 1 using a transmission electron microscope and measuring ten or more pores.

A hydrate of aluminum oxide in the multiple pores of the first porous layer 22 and in the multiple pores of the second porous layer 23 may or may not be sealed through a sealing method using a nickel acetate-based sealant, a nickel fluoride-based sealant, a silicate-based sealant, hot water, or steam of one of these items. Instead of the sealing, a transparent organic material, an inorganic material, or a composite material may be coated. An example of coating using an organic material is a resin coating using resin such as acrylic resin, urethane resin, or fluorine resin. Examples of coating using an inorganic material include DLC (diamond-like carbon), a sputtered film for which a metal such as silicon is sputtered, and an inorganic coating film containing an inorganic component, which is coated with, for example, Permiate (registered trademark) series available from D&D CORPORATION. An example of coating using a composite material is a coating containing resin and an inorganic material.

The arithmetical mean height Sa of the exposed surface 24 of the anodic oxide coating 20 is preferably 0 to 0.45 μm. The arithmetical mean height Sa of the surface 24 of 0.45 μm or less causes part of the light to be reflected on the surface 24 of the anodic oxide coating 20, and this further improves the whiteness of the aluminum member 1. The arithmetical mean height Sa can be measured in accordance with ISO25178. The arithmetical mean height Sa of the surface 24 of the anodic oxide coating 20 can be adjusted by polishing the surface 24 or some other means.

It is preferable that the L* value in the L*a*b* color system of the aluminum member 1 measured from the anodic oxide coating 20 side be 82.5 to 100, that the a* value be −1 to +1, and that the b* value be −1.5 to +1.5. The L* value, a* value, and b* value in the L*a*b* color system can be determined in accordance with JIS Z8781-4: 2013 (Colorimetry-Part 4: CIE 1976 L*a*b* Colour space). The L* value, a* value, and b* value can be measured with a chromatic color-difference meter, and they can be measured under conditions such as a diffuse illumination/0° viewing angle system (D/0), a viewing angle of 2°, and illuminant C.

The L* value of 82.5 or more improves lightness and thus further improves the whiteness of the aluminum member 1. The upper limit of the L* value is not limited to a specific one, and hence it is 100, which is the maximum value of the L*.

The a* value of from −1 to +1 and the b* value of from −1.5 to +1.5 means that the chromatic value is close to 0, and this prevents the aluminum member 1 from looking reddish, yellowish, greenish, and blueish and further improves the whiteness of the aluminum member 1. Note that it is preferable that the a* value be −0.8 to +0.8, and that the b* value be −0.8 to +0.8.

When the reflection intensity on the anodic oxide coating 20 side is measured using a goniophotometer at a detector angle of −80 to +10 degrees, it is preferable that the ratio of the maximum reflection intensity to the minimum reflection intensity be 400 or less. When the above ratio is 400 or less, the aluminum member 1 looks white even when viewed from various angles, and this further reduces the angular dependence of the whiteness. It is preferable that the above ratio be as low as possible, and therefore the lower limit of the above ratio is 1.

As described above, the aluminum member 1 according to the present embodiment includes the substrate 10 formed of aluminum or an aluminum alloy, and the anodic oxide coating 20. The anodic oxide coating 20 includes the barrier layer 21 in contact with the surface 11 of the substrate 10, and the first porous layer 22 in contact with the surface of the barrier layer 21 on the opposite side to the substrate 10. The anodic oxide coating 20 includes the second porous layer 23 in contact with the surface of the first porous layer 22 on the opposite side to the barrier layer 21 and having multiple pores, which are aligned and linearly extend from the surface in contact with the first porous layer 22 toward the surface 24 that is exposed. The first porous layer 22 has at least one of multiple branching pores or multiple pores having an average pore diameter larger than that of the second porous layer 23.

The second porous layer 23 has high translucency because it has multiple pores extending linearly, and most of the incident light is not absorbed by the second porous layer 23 and reaches the first porous layer 22. The first porous layer 22 has at least one of multiple branching pores or multiple pores having an average pore diameter larger than that of the second porous layer 23. Thus, the light that has passed through the first porous layer 22 is diffusely reflected on the first porous layer 22. The light reflected on the surface 11 of the substrate 10 is diffusely reflected further by the first porous layer 22 and passes through the second porous layer 23. Thus, it is estimated that the aluminum member 1 according to the present embodiment has low angular dependence of whiteness. As described above, the second porous layer 23 has high translucency, and most of the light is not absorbed by the second porous layer 23 and is reflected on the surface 11 of the substrate 10, and thus the aluminum member 1 having high whiteness is obtained. Since the aluminum member 1 has a white paper-like appearance, it can be preferably used for a housing, such as a smartphone or a personal computer.

[Method of Producing Aluminum Member]

Figure 2:
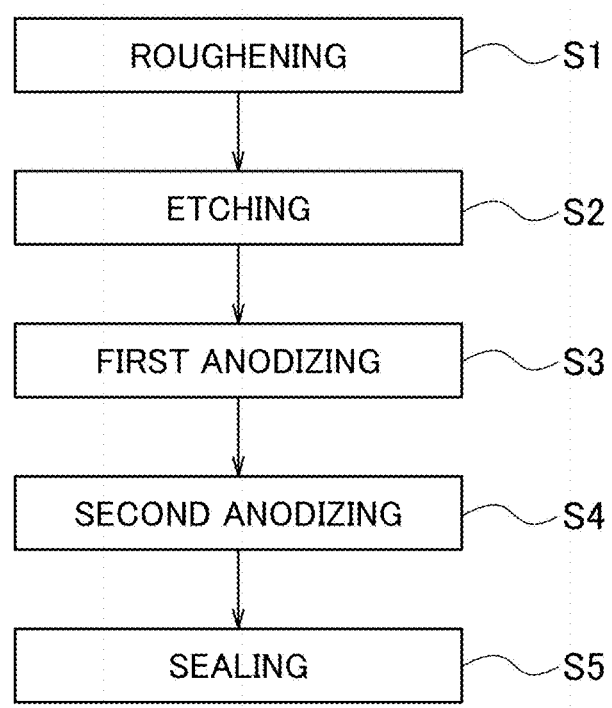
FIG. 2 is a diagram illustrating an example of a method of producing the aluminum member according to the present embodiment.

As illustrated in FIG. 2, a method of producing the aluminum member 1 includes a roughening process S1, an etching process S2, a first anodizing process S3, a second anodizing process S4, and a sealing process S5. Each process will be described in detail below.

(Roughening Process S1)

In the roughening process S1, irregularities are formed on the surface 11 of the substrate 10 formed of aluminum or an aluminum alloy. Although the roughening process S1 is not an essential process, it makes the appearance of the aluminum member 1 whiter. The substrate 10 on which the irregularities are to be formed may be prepared, for example, by preparing a molten metal having a specific element, casting, rolling, heat treatment, and other processes. The substrate 10 on which the irregularities are to be formed may be used as it is after casting, after rolling, or after heat treatment, without subjecting to specific surface treatment. The substrate 10 on which the irregularities are to be formed may be grinded with a milling machine, and the surface 11 may be polished using emery paper, buff polishing, chemical polishing, electrolytic polishing, and the like. The surface 11 of the substrate 10 on which the irregularities are to be formed may be polished to have the arithmetical mean height Sa of less than 100 nm. The surface 11 of the substrate 10 having the arithmetical mean height Sa of less than 100 nm enhances the lightness of the substrate 10. This enables the aluminum member 1 to have a white appearance closer to paper even after the irregularities formation on the surface 11, the etching process S2, the first anodizing process S3, and the second anodizing process S4.

The irregularities on the surface 11 of the substrate 10 may be formed through abrasive blasting, for example.

Abrasive blasting makes particles hit against the surface 11 of the substrate 10 to form the irregularities on the surface 11. The method of abrasive blasting is not particularly limited and at least one of wet blasting or dry blasting may be used, for example. In the roughening process S1, it is preferable that particles having an average particle diameter of 20 µm or less be hit against the surface 11 of the substrate 10 to form the irregularities. The average particle diameter of 20 µm or less prevents the light that has passed through the anodic oxide coating 20 from being absorbed by the irregularities on the surface 11 of the substrate 10, and this makes the appearance of the aluminum member 1 whiter.

The average particle diameter of particles after abrasive blasting is more preferably 10.5 µm or less. The lower limit of the average particle diameter is not limited to a specific one, but is preferably 2 µm or more. In the case where the average particle diameter is 2 µm or more, irregularities are properly formed on the surface 11 of the substrate 10, which diffusely reflects the light that has passed through the anodic oxide coating 20. For this reason, the aluminum member 1 looks white even if it is viewed obliquely from different viewing angles, and this makes the aluminum member 1 look as white as paper. Note that the average particle diameter refers to the particle diameter at the point where the cumulative value is 50% in the particle size distribution on the volume basis, which can be measured using a laser diffraction-scattering method, for example.

Examples of particles used for abrasive blasting include: ceramic beads containing silicon carbide, boron carbide, boron nitride, alumina, zirconia, and the like; metal beads containing stainless steel, steel, and the like; resin beads containing nylon, polyester, melamine resin, and the like; and glass beads containing glass and the like. Note that in the case of wet blasting, particles can be mixed in a liquid such as water, and it can be jetted against the substrate 10. The conditions of abrasive blasting such as the blast pressure and the total number of particles are not particularly limited. The conditions can be adjusted as appropriate depending on the state of the substrate 10 or other factors.

The method of forming irregularities on the surface 11 of the substrate 10 is not limited to abrasive blasting and may be other methods such as laser processing and etching using a roughening agent. In laser processing, irregularities are formed by irradiating the surface 11 of the substrate 10 with laser light. The diameter, depth, pitches, and the like of concave parts and convex parts on the surface 11 of the substrate 10 can be changed by adjusting the spot diameter, wavelength, power, frequency, and pulse width of the laser light, moving speed of the laser light with respect to the substrate 10, and the like. In the roughening using etching, etching is performed using a fluoride-containing chemical such as ALSATIN (registered trademark) OL-25 of OKUNO CHEMICAL INDUSTRIES CO., LTD. to form the irregularities. The depth of concave parts and the height of convex parts on the surface 11 of the substrate 10 can be changed by adjusting the temperature, the concentration of the etchant, and time.

(Etching Process S2)

Although the etching process S2 is not an essential process, it is possible to smooth the irregularities by removing sharp edges of the irregularities on the surface 11 of the substrate 10 formed in the roughening process S1. The conditions of etching are not particularly limited and may be any conditions as long as the aluminum member 1 having high whiteness is obtained.

In the etching process S2, it is preferable to etch the roughened substrate 10 using at least one of an acidic solution or an alkaline solution. For the acidic solution, for example, an aqueous solution of hydrochloric acid, sulfuric acid, nitric acid, or the like can be used. For the alkaline solution, for example, an aqueous solution of sodium hydroxide, potassium hydroxide, sodium carbonate, or the like can be used. The concentrations of the acidic solution and the alkaline solution are not particularly limited, but in the case of using an aqueous solution of sodium hydroxide, the concentration may be 10 to 100 g/L.

The etching time and the etching temperature are also not limited to specific values and may be adjusted as necessary depending on the state of the substrate 10 and the etchant. As examples, the etching time is 5 to 90 seconds, and the etching temperature is 40 to 60° C.

(First Anodizing Process S3)

In the first anodizing process S3, the substrate 10 on which irregularities are formed is subjected to first anodization using an electrolytic solution capable of forming multiple pores that are aligned and extend linearly. The electrolytic solution used in the first anodization is not limited to a specific one as long as it is capable of forming multiple linear pores in the second porous layer 23. The electrolytic solution may be an aqueous solution containing at least one electrolyte selected from the group consisting of sulfuric acid, amide sulfuric acid, an acid containing a carboxyl group, and each salt thereof, for example. Examples of the acid containing a carboxyl group include at least one acid selected from the group consisting of oxalic acid, salicylic acid, citric acid, maleic acid, and tartaric acid. Among these, the electrolytic solution for the first anodization preferably contains at least one selected from the group consisting of sulfuric acid, amide sulfuric acid, and a compound having a carboxyl group. The electrolytic solution for the first anodization is preferably an acidic electrolytic solution, and the pH of the electrolytic solution is 0 to 2, for example. The concentration of the above electrolyte in the electrolytic solution is 10 to 600 g/L, for example.

The conditions of the first anodization are not particularly limited and may be adjusted as necessary depending on the state of the substrate 10 or other factors. The temperature of the electrolytic solution may be 0 to 30° C., for example. The current density may be 1 to 50 mA/cm$^2$, for example. The electrolysis time may be 10 to 50 minutes, for example.

(Second Anodizing Process S4)

In the second anodizing process S4, the substrate 10 that has been subjected to the first anodization is subjected to second anodization using an electrolytic solution. The electrolytic solution for the second anodization is an electrolytic solution capable of forming at least one of multiple branching pores or multiple pores having an average pore diameter larger than that of the above linearly extending multiple pores. The electrolytic solution used in the second anodizing process S4 is not limited to a specific one as long as at least one of multiple branching pores or multiple pores having an average pore diameter larger than that of the above linearly extending multiple pores can be formed in the first porous layer 22. The electrolytic solution may be an aqueous solution containing at least one electrolyte selected from the group consisting of a compound having a carboxyl group, such as tartaric acid, phosphoric acid, chromic acid, boric acid, and each salt thereof. Among these, the electrolytic solution for the second anodization preferably contains at least one selected from the group consisting of a compound having a carboxyl group, phosphoric acid, and each salt thereof. Specifically, the electrolytic solution for the second anodization is preferably a tartrate aqueous solution. A tartrate aqueous solution is capable of forming at least multiple branching pores. It is also preferable that the electrolytic solution for the second anodization be an aqueous phosphoric acid solution. The aqueous phosphoric acid solution is capable of forming multiple pores having an average pore diameter larger than that of the above linearly extending multiple pores. The electrolytic solution for the second anodization may contain at least one selected from the group consisting of sodium, potassium, and ammonia. The electrolytic solution for the second anodization may be an acidic electrolytic solution or may be an alkaline electrolytic solution. When the electrolytic solution for the second anodization is an alkaline electrolytic solution, the pH of the electrolytic solution is 9 to 14, for example. To make an electrolytic solution alkaline, sodium hydroxide or the like may be mixed with the electrolytic solution. The concentration of the above electrolyte in the electrolytic solution is 0.5 to 200 g/L, for example.

The conditions for the second anodization are not particularly limited and may be adjusted as appropriate depending on the state of the substrate 10 or other factors. As an example, the temperature of the electrolytic solution may be 0 to 40° C., for example. The voltage may be 2 to 500 V, for example. The electrical quantity per unit area may be 0.05 to 40 $C/cm^2$, for example. The electrolysis time may be 0.1 to 180 minutes, for example.

(Sealing Process S5)

Although the sealing process S5 is not an essential process, it is possible to improve the corrosion resistance of the aluminum member 1 by sealing the pores of the first porous layer 22 and the pores of the second porous layer 23 with a hydrate of aluminum oxide. The sealing process can be performed using a known method, and for example, can be performed using high temperature water vapor, a nickel acetate aqueous solution, nickel fluoride, or the like.

As described above, the method of producing the aluminum member 1 according to the present embodiment includes the first anodizing process S3 in which the substrate 10 formed of aluminum or an aluminum alloy is subjected to first anodization using an electrolytic solution capable of forming multiple pores that are aligned and extend linearly. The above method includes the second anodizing process S4 in which the substrate 10 subjected to the first anodization is subjected to second anodization using an electrolytic solution. The electrolytic solution for the second anodization is an electrolytic solution capable of forming at least one of multiple branching pores or multiple pores having an average pore diameter larger than that of linearly extending multiple pores.

Since the above method includes the first anodizing process S3 and the second anodizing process S4, the anodic oxide coating 20 is formed. In the first anodizing process S3, multiple pores aligned and linearly extending are formed in the anodic oxide coating 20. In the second anodizing process S4, at least one of multiple branching pores or multiple pores having an average pore diameter larger than that of the linearly extending multiple pores is formed in the anodic oxide coating 20. Thus, the anodic oxide coating 20 including the barrier layer 21, the first porous layer 22, and the second porous layer 23 is formed through the first anodizing process S3 and the second anodizing process S4. Hence, it is possible to produce the aluminum member 1 described above using the above method.

EXAMPLES

Although hereinafter, the present embodiment will be described in more detail using examples and comparative examples, the present embodiment is not limited to these examples.

Example 1

(Roughening)

A rolled and annealed 3 mm thick 5000 series aluminum alloy sheet that was cut to 50 mm in length and 50 mm in width was used as the substrate. The 5000 series aluminum alloy contains 4.31% by mass of magnesium, 0.02% by mass of iron, and 0.02% by mass of silicon, and the balance is aluminum (Al) and unavoidable impurities.

Dry blasting was performed by making particles hit against the substrate to form irregularities on the surface of the substrate. The particles used were Fuji Random WA particle number 1200 (alumina particles, maximum particle diameter: 27.0 μm, average particle diameter: 9.5±0.8 μm) available from Fuji Manufacturing Co., Ltd. After abrasive blasting, the substrate was immersed in an aqueous solution of 200 g/L nitric acid for 3 minutes at room temperature (about 20° C.) and was defatted.

(Etching)

The substrate on which irregularities were formed was immersed in an aqueous sodium hydroxide solution having a concentration of 50 g/L at a temperature of 50° C. for 60 seconds to be etched, and then was immersed in an aqueous nitric acid solution having a concentration of 200 g/L for 2 minutes at room temperature (about 20° C.) to remove smuts.

(First Anodization)

The etched substrate was immersed in an acidic aqueous solution of pH 0 containing 180 g/L of sulfuric acid and was subjected to first anodization under electrolysis conditions of a temperature of 18° C., a current density of 15 $mA/cm^2$, and an electrolysis time of 33 minutes.

(Second Anodization)

The member subjected to the first anodization was immersed in an alkaline aqueous solution of pH 13 containing 106 g/L of disodium tartrate dihydrate and 3 g/L of sodium hydroxide. The above member was then subjected to second anodization under electrolytic conditions of a temperature of 5° C., a voltage of 100 V, an electrical quantity of 1 $C/cm^2$, a step-up rate of 1 V/s, and an electrolysis time of about 4 minutes.

(Sealing)

The member subjected to the second anodization was sealed with a nickel acetate-based sealant at 90° C. for 30 minutes. In this manner, the aluminum member according to the present example was produced.

Example 2

An aluminum member according to the present example was produced in the same manner as example 1 except that the voltage of the second anodization was set to 160 V.

Example 3

An aluminum member was produced in the same manner as example 2 except that a 7000 series aluminum alloy sheet subjected to rolling and T6 treatment was used as the substrate. The above 7000 series aluminum alloy sheet contains 0 to 10% by mass of magnesium, 0.1% by mass or less of iron, 0.1% by mass or less of silicon, and 10% by mass or less of zinc, and the balance is aluminum and unavoidable impurities.

Example 4

An aluminum member was produced in the same manner as in example 1 except that the substrate was not subjected to abrasive blasting and the voltage of the second anodization was set to 20 V.

Example 5

An aluminum member was produced in the same manner as in example 1 except that the substrate was not subjected to abrasive blasting and the voltage of the second anodization was set to 40 V.

Example 6

An aluminum member was produced in the same manner as in example 1 except that the substrate was not subjected to abrasive blasting and the voltage of the second anodization was set to 80 V.

Example 7

An aluminum member was produced in the same manner as in example 1 except that the substrate was not subjected to abrasive blasting and the voltage of the second anodization was set to 120 V.

Example 8

An aluminum member was produced in the same manner as in example 1 except that the substrate was not subjected to abrasive blasting and the voltage of the second anodization was set to 160 V.

Example 9

An aluminum member was produced in the same manner as in example 1 except that the substrate was not subjected to abrasive blasting and the voltage of the second anodization was set to 200 V.

Example 10

An aluminum member was produced in the same manner as in example 1 except that the substrate was not subjected to abrasive blasting and the voltage of the second anodization was set to 240 V.

Example 11

The member subjected to the first anodization was immersed in an aqueous phosphoric acid solution (pH 1) having a concentration of 98 g/L. The above member was then subjected to the second anodization under electrolysis conditions of a temperature of 5° C., a voltage of 100 V, an electrical quantity of 1 C/cm$^2$, a step-up rate of 1 V/s, and an electrolysis time of about 4 minutes. The aluminum member was produced in the same manner as in example 1 except the above conditions.

Comparative Example 1

The aluminum member according to the present example was produced in the same manner as example 1 except that the second anodization was not performed and the sealing was performed on the member that had been subjected to the first anodization.

Comparative Example 2

The etched substrate was immersed in an aqueous solution of pH 13 containing 106 g/L of disodium tartrate dihydrate and 4 g/L of sodium hydroxide. The above member was then anodized under conditions of a temperature of 5° C., a voltage of 160 V, an electrical quantity of 20 C/cm$^2$, a step-up rate of 1 V/s, and an electrolysis time of about 4 minutes, and sealing was performed thereon. The aluminum member was produced in the same manner as in example 1 except the above conditions.

Comparative Example 3

An aluminum member was produced in the same manner as in comparative example 2 except that the substrate was not subjected to abrasive blasting.

Comparative Example 4

An aluminum member was produced in the same manner as in comparative example 1 except that the substrate was not subjected to abrasive blasting.

Comparative Example 5

The etched substrate was immersed in an aqueous phosphoric acid solution (pH 1) having a concentration of 98 g/L. The above member was then anodized under electrolysis conditions of a temperature of 5° C., a voltage of 100 V, an electrical quantity of 20 C/cm$^2$, a step-up rate of 1 V/s, and an electrolysis time of about 4 minutes. The aluminum member was produced in the same manner as in example 1 except the above conditions.

[Evaluation]

The aluminum member obtained in each example was evaluated as follows in terms of the irregularities on the substrate surface of the aluminum member, the average pore diameter of the first and second porous layers, the color tone of the aluminum member, and the angular dependence of the whiteness.

(Arithmetical Mean Height Sa and Maximum Height Sz)

First, each aluminum member obtained as described above was immersed in a solution of chromic (VI) and phosphoric acid in accordance with JIS H8688: 2013 to dissolve and remove the anodic oxide coating. Then, the arithmetical mean height Sa and the maximum height Sz of the surface on the anodic oxide coating side of the substrate were measured in accordance with ISO25178 using a 3D white-light interference microscope Contour GT-I of Bruker AXS GmbH. The arithmetical mean height Sa and the maximum height Sz were measured under conditions of a measurement range of 60 μm×79 μm, an objective lens of 115 times, and an internal lens of 1 times.

(Mean Width of Roughness Profile Elements RSm)

First, the anodic oxide coating of the aluminum member obtained as described above was dissolved and removed in a solution of chromic (VI) and phosphoric acid in accordance with JIS H8688:2013. Then, the mean width of roughness profile elements RSm on the surface on the anodic oxide coating side of the substrate was measured in accordance with JIS B0601:2013 using a 3D white-light interference microscope Contour GT-I of Bruker AXS GmbH. The mean width of roughness profile elements RSm was measured under conditions of cut-off λc of 80 μm, an objective lens of 115 times, an internal lens of 1 times, and a measuring distance of 79 μm.

(Average Pore Diameter)

The cross section of the aluminum member was observed using a transmission electron microscope, and the average pore diameter of the porous layer was measured.

(Color Tone)

In accordance with JIS Z8722, the color tone of the aluminum member was measured on the surface of the anodic oxide coating using a chromatic color-difference meter CR400 available from KONICA MINOLTA JAPAN, INC., and L*, a*, and b* values were obtained. The color tone was measured under the conditions that: the illumination and light receiving optical system was a diffuse illumination/0° viewing angle system (D/0), the observation condition was a color matching function approximation in a 2° field of view according to CIE, the light source was a C light source, and the color specification system was L*a*b*.

(Angular Dependence)

Figure 3:
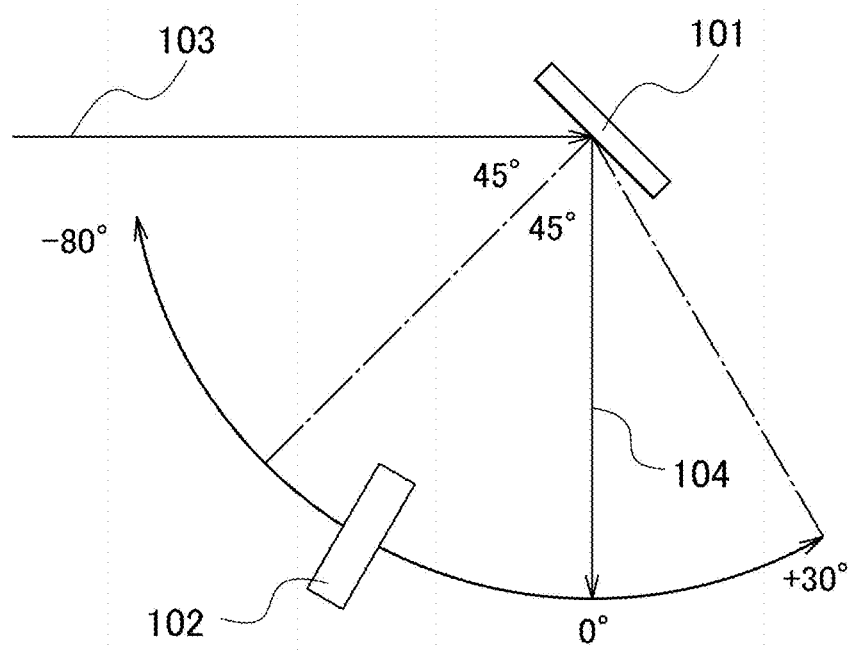
FIG. 3 is a diagram illustrating a method for evaluating the angular dependence of whiteness using a goniophotometer.

The angular dependence of the whiteness of the aluminum member was evaluated using a goniophotometer (Type GP-2) available from NIKKA DENSOK LIMITED. Specifically, as illustrated in FIG. 3, an aluminum member 101 was irradiated with light, and the intensity of the light received by a detector 102 was measured. The detector 102 is provided rotatably around the aluminum member 101 at a predetermined distance. When the detector 102 is arranged at a position where the incident angle of incident light 103 is 45 degrees and the reflection angle of reflected light 104 is 45 degrees, the detector angle is 0 degrees. The reflection intensity of the reflected light 104 reflected on the aluminum member 101 on the anodic oxide coating side was measured at 0.5 degree intervals in a range of the detector angle from −80 degrees to +30 degrees. The ratio of the maximum reflection intensity to the minimum reflection intensity (maximum reflection intensity/minimum reflection intensity) in a range of the detector angle from −80 degrees to +10 degrees was then calculated. When the above ratio was 400 or less, the angular dependence was decided as "good", and when the above ratio was greater than 400, the angular dependence was decided as "bad".

TABLE 1

| | Substrate | Roughening | First anodization | Second anodization | Sa (μm) | Sz (μm) | RSm (μm) | First porous layer average pore diameter (nm) | Second porous layer average pore diameter (nm) |
|---|---|---|---|---|---|---|---|---|---|
| Example 1 | 5000 series alloy | Blasting | Aqueous sulfuric acid solution 15 mA/cm² 33 min. | Tartaric acid Na 100 V 1 C/cm² | 0.35 | 4.1 | 7.5 | 30 | 12 |
| Example 2 | 5000 series alloy | Blasting | Aqueous sulfuric acid solution 15 mA/cm² 33 min. | Tartaric acid Na 160 V 1 C/cm² | 0.31 | 3.80 | 8.50 | 40 | 13 |
| Example 3 | 7000 series alloy | Blasting | Aqueous sulfuric acid solution 15 mA/cm² 33 min. | Tartaric acid Na 160 V 1 C/cm² | 0.31 | 3.60 | 8.20 | 42 | 12 |
| Example 4 | 5000 series alloy | — | Aqueous sulfuric acid solution 15 mA/cm² 33 min. | Tartaric acid Na 20 V 1 C/cm² | 0.29 | 1.93 | 3.9 | 24 | 12 |
| Example 5 | 5000 series alloy | — | Aqueous sulfuric acid solution 15 mA/cm² 33 min. | Tartaric acid Na 40 V 1 C/cm² | 0.27 | 1.84 | 3.8 | 26 | 11 |
| Example 6 | 5000 series alloy | — | Aqueous sulfuric acid solution 15 mA/cm² 33 min. | Tartaric acid Na 80 V 1 C/cm² | 0.25 | 1.93 | 3.9 | 30 | 13 |
| Example 7 | 5000 series alloy | — | Aqueous sulfuric acid solution 15 mA/cm² 33 min. | Tartaric acid Na 120 V 1 C/cm² | 0.23 | 1.83 | 3.6 | 36 | 14 |
| Example 8 | 5000 series alloy | — | Aqueous sulfuric acid solution 15 mA/cm² 33 min. | Tartaric acid Na 160 V 1 C/cm² | 0.23 | 2.40 | 5.10 | 43 | 13 |
| Example 9 | 5000 series alloy | — | Aqueous sulfuric acid solution 15 mA/cm² 33 min. | Tartaric acid Na 200 V 1 C/cm² | 0.3 | 2.54 | 3.7 | 44 | 15 |
| Example 10 | 5000 series alloy | — | Aqueous sulfuric acid solution 15 mA/cm² 33 min. | Tartaric acid Na 240 V 1 C/cm² | 0.21 | 2.30 | 5.00 | 44 | 12 |
| Example 11 | 5000 series alloy | — | Aqueous sulfuric acid solution 15 mA/cm² 33 min. | Aqueous phosphoric acid solution 100 V 1C/cm² | 0.21 | 2.40 | 5.10 | 105 | 13 |

TABLE 2

| | Color tone | | | Angular dependence | | | |
|---|---|---|---|---|---|---|---|
| | L* | a* | b* | Minimum intensity | Maximum intensity | Maximum/minimum | Decision |
| Example 1 | 88.10 | −0.52 | 0.04 | 0.003250 | 0.041661 | 12.82 | Good |
| Example 2 | 85.10 | −0.06 | 0.34 | 0.006250 | 0.037010 | 5.92 | Good |
| Example 3 | 87.13 | −0.24 | −0.48 | 0.005745 | 0.040397 | 7.03 | Good |
| Example 4 | 85.32 | −0.49 | 0.47 | 0.007150 | 0.147038 | 20.6 | Good |
| Example 5 | 85.08 | −0.46 | 0.12 | 0.000117 | 0.009708 | 82.8 | Good |
| Example 6 | 82.55 | −0.38 | 0.06 | 0.000383 | 0.019239 | 50.2 | Good |
| Example 7 | 85.43 | −0.25 | 0.25 | 0.000412 | 0.117191 | 284.4 | Good |
| Example 8 | 85.50 | −0.30 | −0.14 | 0.000477 | 0.151067 | 316.7 | Good |
| Example 9 | 87.80 | −0.39 | −0.59 | 0.000342 | 0.053877 | 157.8 | Good |
| Example 10 | 88.32 | −0.48 | 0.03 | 0.000537 | 0.021177 | 39.44 | Good |
| Example 11 | 87.29 | −0.42 | 0.50 | 0.005200 | 0.116340 | 22.37 | Good |

TABLE 3

| | Substrate | Roughening | Anodization | Sa (μm) | Sz (μm) | RSm (μm) | Porous layer average pore diameter (nm) |
|---|---|---|---|---|---|---|---|
| Comparative example 1 | 5000 series alloy | Blasting | Aqueous sulfuric acid solution 15 mA/cm² 33分 | 0.34 | 4.30 | 8.60 | 12 |
| Comparative example 2 | 5000 series alloy | Blasting | Tartaric acid Na 160 V 20 C/cm² | 0.32 | 3.20 | 7.80 | 43 |
| Comparative example 3 | 5000 series alloy | — | Tartaric acid Na 160 V 20 C/cm² | 0.21 | 2.21 | 5.20 | 42 |
| Comparative example 4 | 5000 series alloy | — | Aqueous sulfuric acid solution 15 mA/cm² 33分 | 0.20 | 2.00 | 5.40 | 12 |
| Comparative example 5 | 5000 series alloy | Blasting | Aqueous phosphoric acid solution 100 V 20 C/cm² | 0.35 | 3.20 | 6.30 | 105 |
| Reference example 1 | Copy paper | — | — | — | — | — | — |

TABLE 4

| | Color tone | | | Angular dependence | | | |
|---|---|---|---|---|---|---|---|
| | L* | a* | b* | Minimum intensity | Maximum intensity | Maximum/minimum | Decision |
| Comparative example 1 | 91.24 | −0.14 | 0.66 | 0.000325 | 0.195837 | 602.54 | Bad |
| Comparative example 2 | 82.20 | −0.42 | −0.81 | — | — | — | — |
| Comparative example 3 | 80.15 | −0.46 | −0.73 | — | — | — | — |
| Comparative example 4 | 86.60 | −0.80 | −0.32 | 0.000166 | 0.267464 | 1611 | Bad |
| Comparative example 5 | 77.05 | 2.79 | −0.02 | — | — | — | — |
| Reference example 1 | 90.22 | 0.49 | −0.89 | 0.019031 | 0.026048 | 1.37 | Good |

Figure 4:
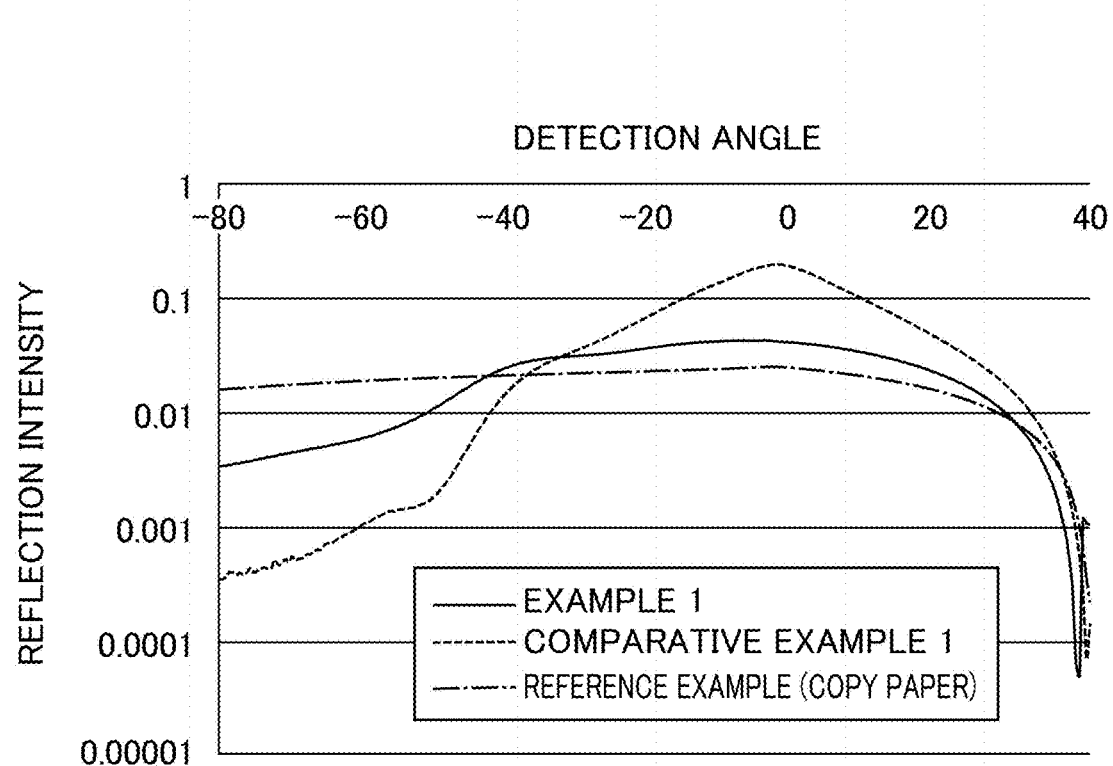
FIG. 4 is a graph illustrating the angular dependence of example 1, comparative example 1, and a reference example (copy paper).

As illustrated in Table 1, the aluminum members of examples 1 to 11 had L* values of 85 to 100, a* values of −1 to +1, and b* values of −1.5 to +1.5. Also, as illustrated in FIG. 4, the aluminum member of example 1 had a greater reflection intensity than that of the aluminum member of comparative example 1 at detector angles of −80 to −40 degrees, and had an angular dependence of the reflection intensity of light lower as in the copy paper in the reference example. Furthermore, in the aluminum members of examples 1 to 11, the ratio of the maximum reflection intensity to the minimum reflection intensity was 400 or less when the reflection intensity on the anodic oxide coating side was measured using a goniophotometer at detector angles of −80 to +10 degrees.

In contrast, in the aluminum members in comparative examples 1 to 5, the L* value was low or the angular dependence was high because the first anodization and the second anodization were not performed. As in comparative examples 2, 3, and 5, an aluminum member having a high L* value is not obtained only by performing anodization using an electrolytic solution for the purpose of forming multiple branching pores or multiple pores having an average pore diameter larger than the multiple pores extending linearly. In addition, as in comparative examples 1 and 4, by performing only anodization using an aqueous sulfuric acid solution, an aluminum member having a high L* value is obtained, but an aluminum member having low angular dependence is not obtained. Thus, it is estimated that an aluminum member having high whiteness and low angular dependence of whiteness is obtained through these two types of anodization.

An aluminum member was produced as follows to observe the cross section using a transmission electron microscope.

Example 12

An aluminum member was produced in the same manner as in example 2 except that the electrolysis time for the first anodization was 11 minutes, the electrolysis time for the second anodization was 80 seconds, and no sealing was performed.

Comparative Example 6

An aluminum member according to the present example was produced in the same manner as example 12 except that the second anodization was not performed.

Comparative Example 7

An aluminum member was produced in the same manner as in example 12 except that the first anodization was not performed, the voltage of the second anodization was 110 V, and the electrolysis time was 11 minutes.

Figure 5:
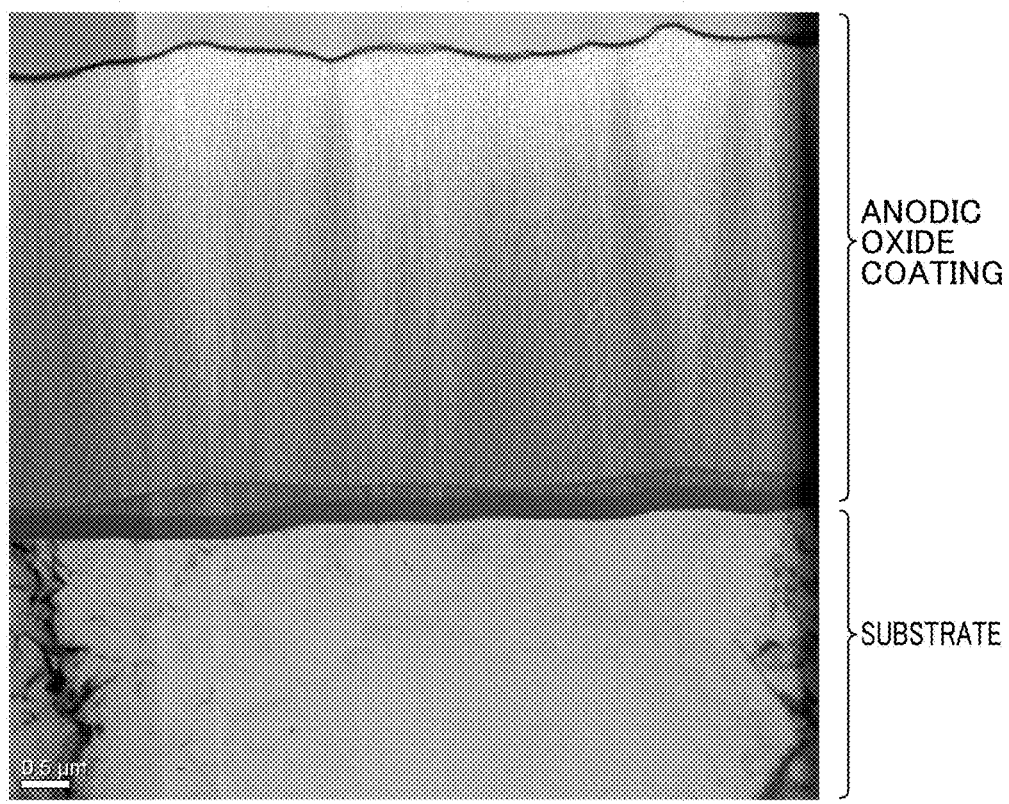
FIG. 5 is an image of a cross section of an aluminum member of example 12 processed using FIB (focused ion beam) and magnified 2,550 times using a TEM (transmission electron microscope).
Figure 6:
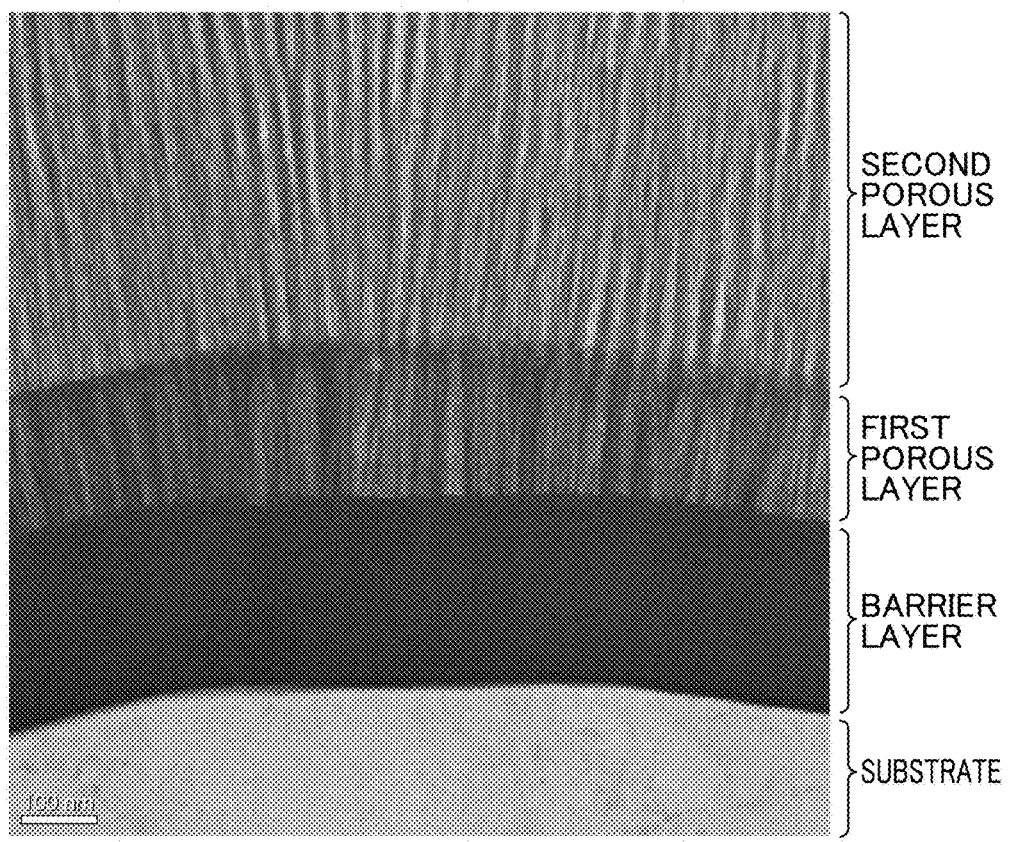
FIG. 6 is an image of a cross section of the aluminum member of example 12 processed using FIB (focused ion beam) and magnified 19,500 times using a TEM (transmission electron microscope).
Figure 7:
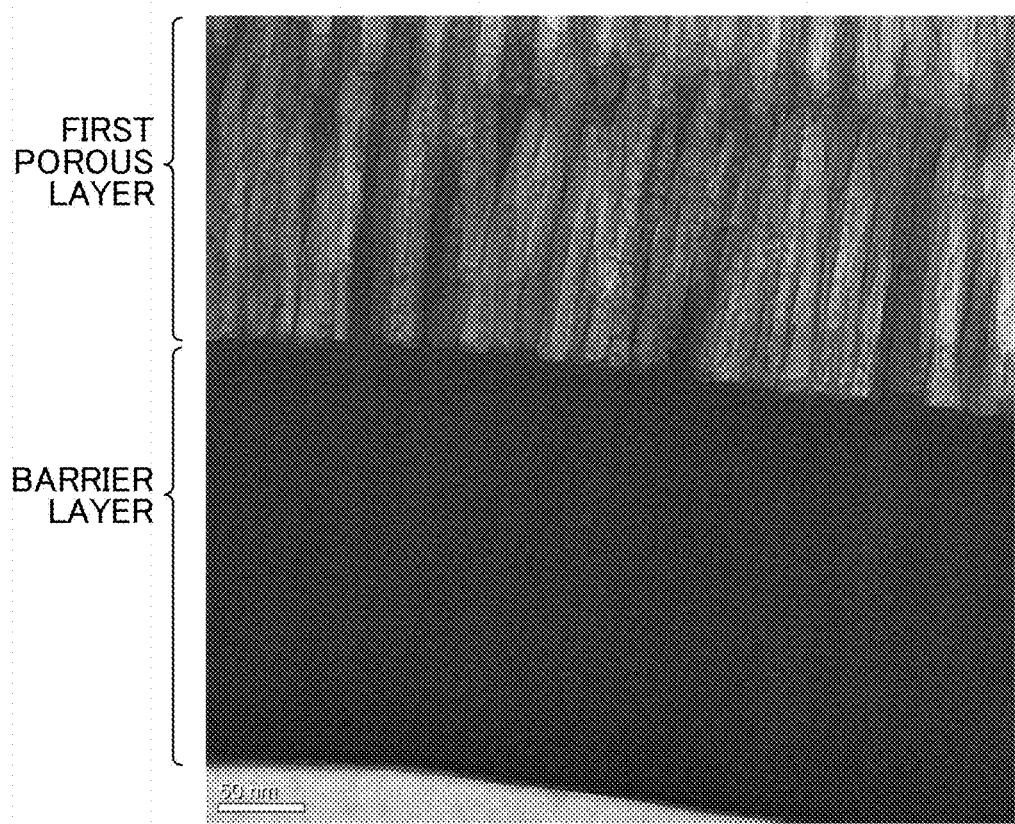
FIG. 7 is an image of a cross section of the aluminum member of example 12 processed using FIB (focused ion beam) and magnified 43,000 times using a TEM (transmission electron microscope).
Figure 8:
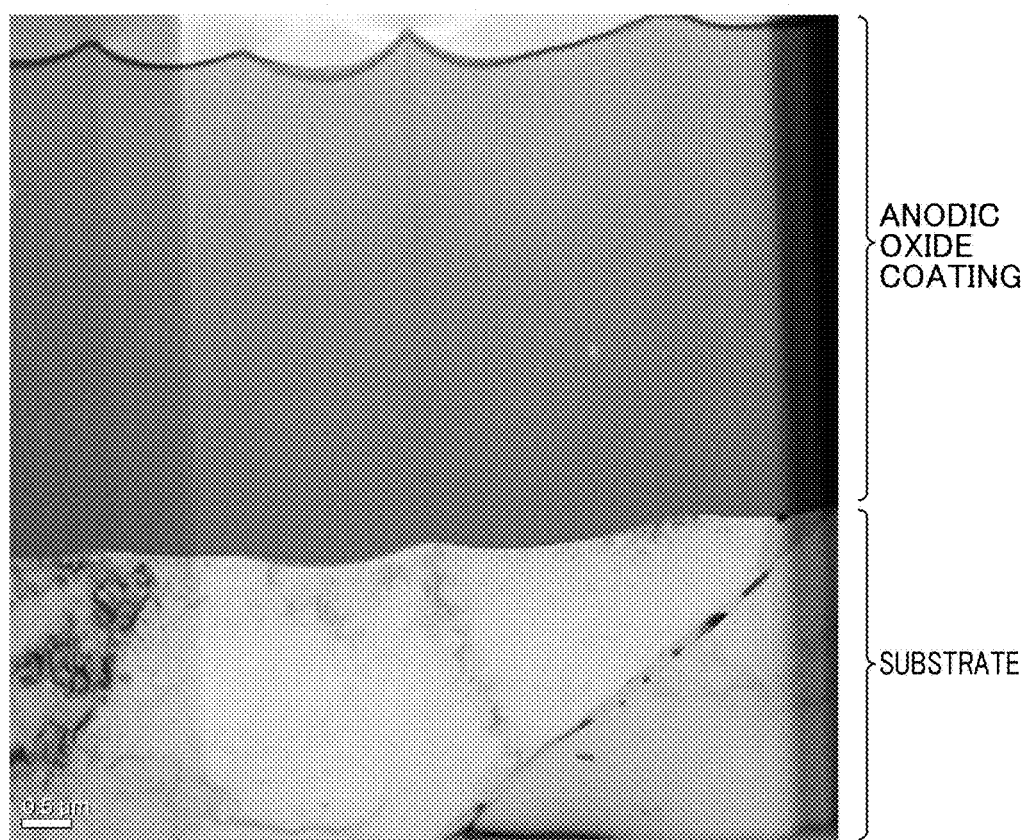
FIG. 8 is an image of a cross section of an aluminum member of comparative example 6 processed using FIB (focused ion beam) and magnified 2,550 times using a TEM (transmission electron microscope).
Figure 9:
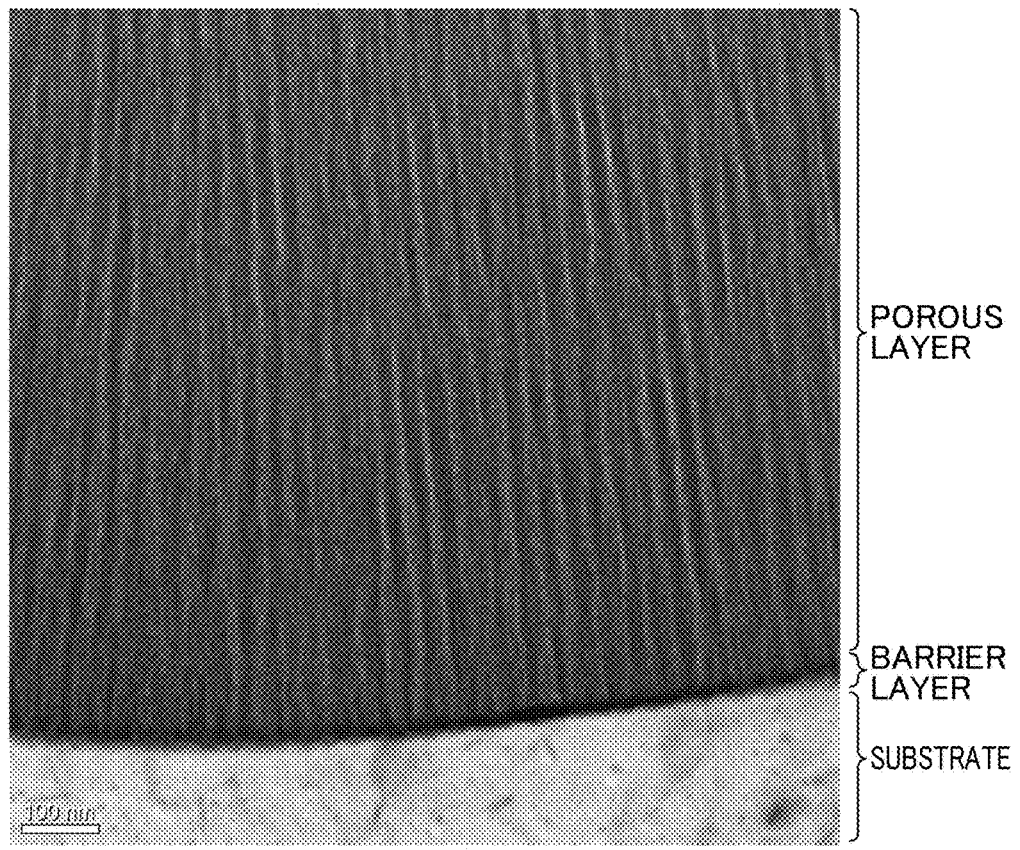
FIG. 9 is an image of a cross section of the aluminum member of comparative example 6 processed using FIB (focused ion beam) and magnified 19,500 times using a TEM (transmission electron microscope).
Figure 10:
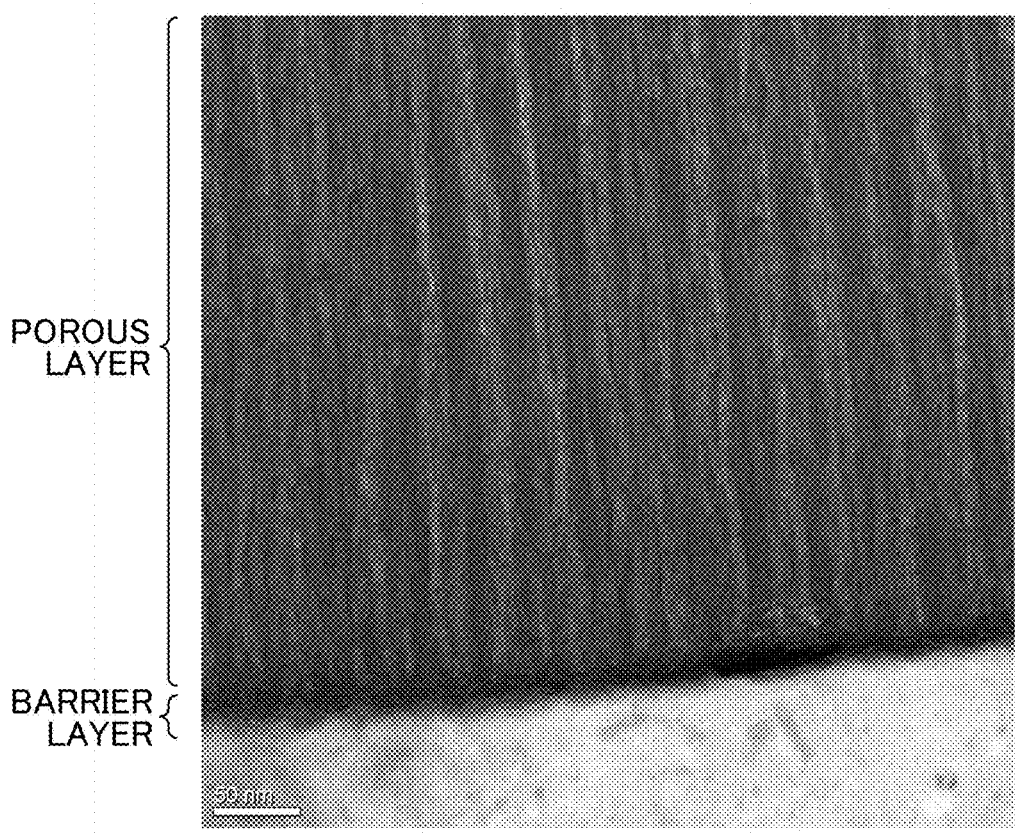
FIG. 10 is an image of a cross section of the aluminum member of comparative example 6 processed using FIB (focused ion beam) and magnified 43,000 times using a TEM (transmission electron microscope).
Figure 11:
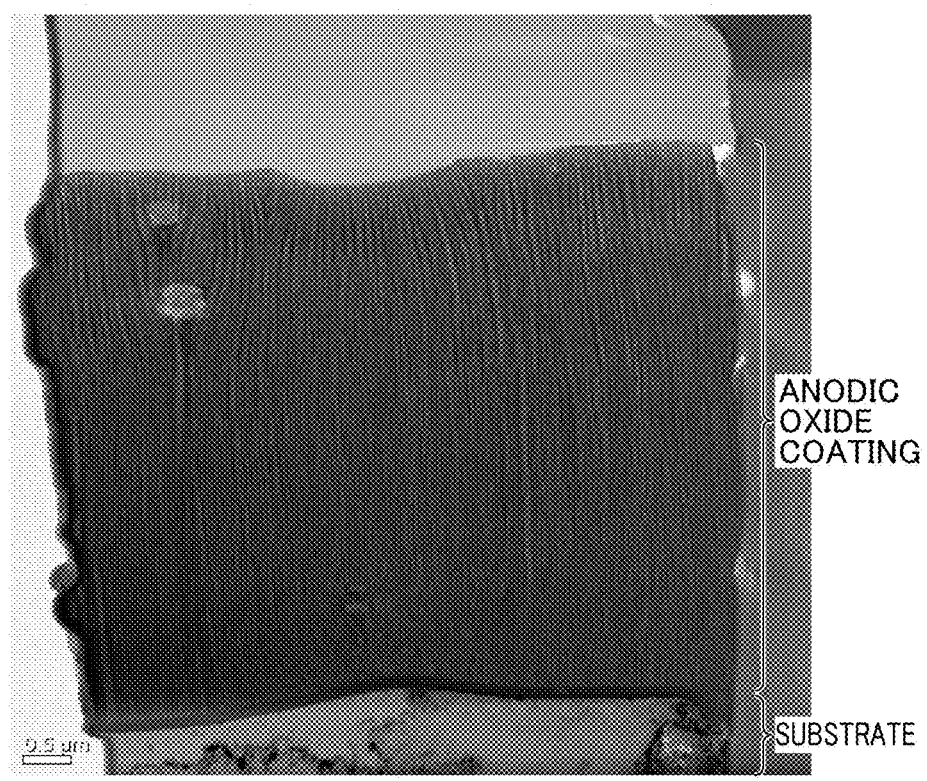
FIG. 11 is an image of a cross section of an aluminum member of comparative example 7 processed using FIB (focused ion beam) and magnified 2,550 times using a TEM (transmission electron microscope).
Figure 12:
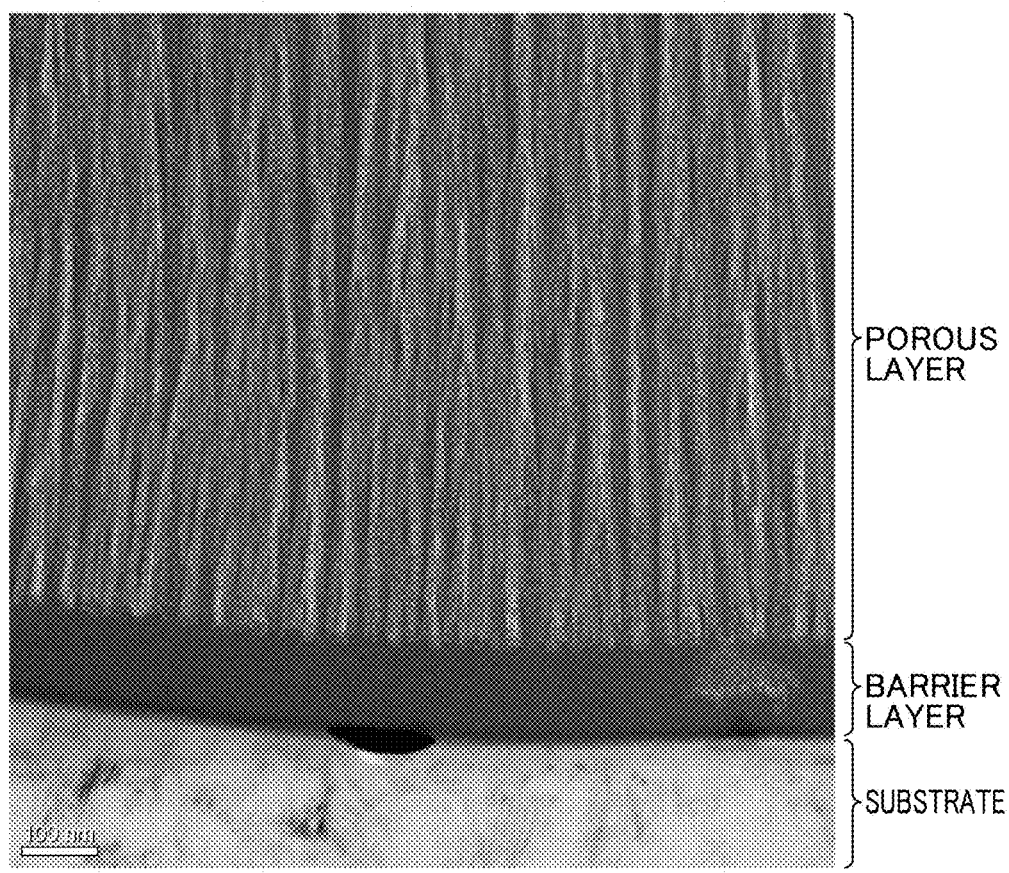
FIG. 12 is an image of a cross section of the aluminum member of comparative example 7 processed using FIB (focused ion beam) and magnified 19,500 times using a TEM (transmission electron microscope).
Figure 13:
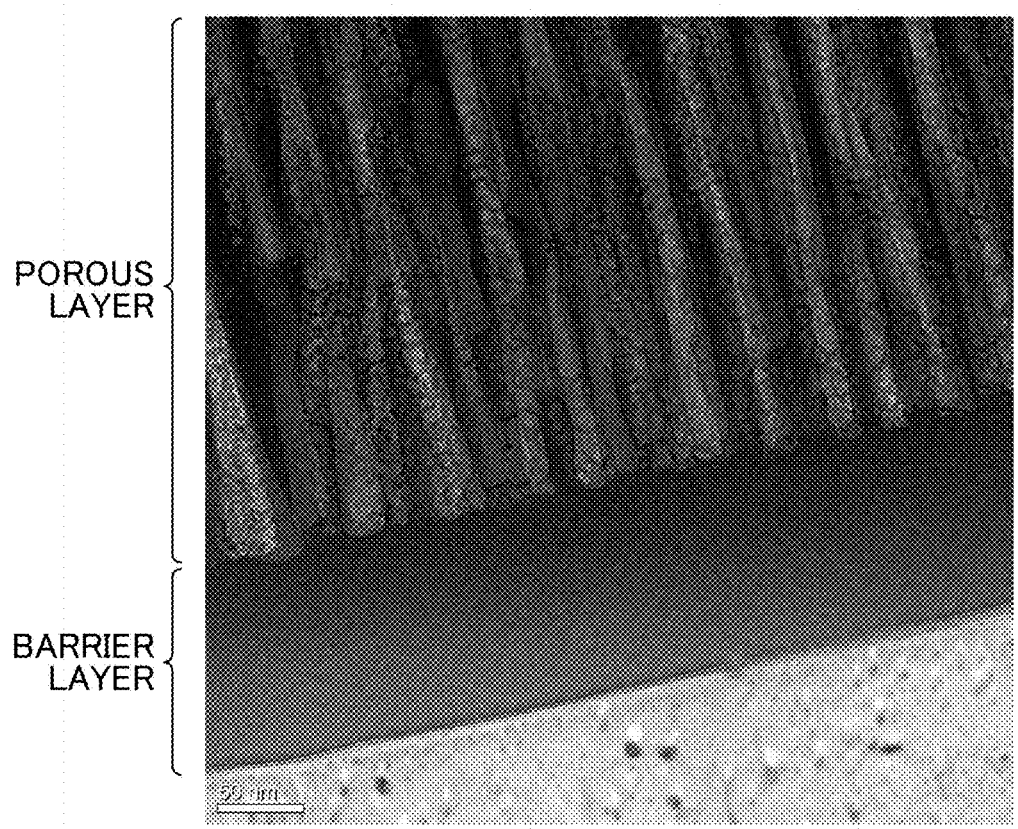
FIG. 13 is an image of a cross section of the aluminum member of comparative example 7 processed using FIB (focused ion beam) and magnified 43,000 times using a TEM (transmission electron microscope).

FIGS. 5, 6, and 7 are images of the cross section of the aluminum member of example 12 processed by FIB (focused ion beam) and magnified 2,550, 19,500, and 43,000 times using a transmission electron microscope, respectively. FIGS. 8, 9 and 10 are images of the cross section of the aluminum member of comparative example 6 processed by FIB (focused ion beam) and magnified 2,550, 19,500, and 43,000 times using a transmission electron microscope, respectively. FIGS. 11, 12 and 13 are images of the cross section of the aluminum member of comparative example 7 processed by FIB (focused ion beam) and magnified 2,550, 19,500, and 43,000 times using a transmission electron microscope, respectively. As illustrated in FIGS. 5 to 13, it can be seen that the first porous layer has multiple branching pores and the second porous layer has multiple pores extending linearly. From FIGS. 5 to 13 and the results of elemental analysis using EDS (energy dispersive X-ray spectroscopy), which is not illustrated, it can be seen that in the anodic oxide coating, the barrier layer and the first porous layer, which are derived from the second anodization, are formed on the surface of the substrate. It can also be seen that the second porous layer derived from the first anodization is formed on the surface of the first porous layer.

Note that also for the aluminum members of examples 1 to 10, the first porous layer had multiple branching pores and the second porous layer had multiple pores extending linearly. For the aluminum member of example 11, the second porous layer had multiple pores extending linearly, but the first porous layer did not have multiple branching pores. However, the first porous layer had multiple pores having an average pore diameter larger than that of the second porous layer as in Table 1. From the above results, it can be seen that the aluminum member, which has the first and second porous layers and where the first porous layer has at least one of multiple branching pores or multiple pores having an average pore diameter larger than that of the second porous layer, has a white color and low angular dependence.

The entire contents of Japanese Patent Application No. 2020-178051 (filed on Oct. 23, 2020) are incorporated herein.

Although the present embodiment has been described using examples and comparative examples as above, the present embodiment is not limited to these examples but can be modified variously within the scope of the present embodiment.

The invention claimed is:

1. An aluminum member comprising:
a substrate formed of aluminum or an aluminum alloy; and
an anodic oxide coating that includes a barrier layer in contact with a surface of the substrate, a first porous layer in contact with a surface of the barrier layer on an opposite side to the substrate, and a second porous layer in contact with a surface of the first porous layer on an opposite side to the barrier layer and including multiple pores aligned and linearly extending from a surface in contact with the first porous layer toward an exposed surface, wherein
the first porous layer includes at least one of: multiple branching pores; or multiple pores having an average pore diameter larger than that of the second porous layer,
a thickness of the barrier layer is less than 300 nm,
the aluminum member has an L* value of 82.5 to 100, an a* value of −1 to +1, and a b* value of −1.5 to +1.5, where the L* value, the a* value, and the b* value are values in a L*a*b* color system measured from a side of the anodic oxide coating,
a ratio of a maximum reflection intensity to a minimum reflection intensity is 400 or less when reflection intensity on a side of the anodic oxide coating is measured using a goniophotometer at a detector angle of −80 to +10 degrees.

2. The aluminum member according to claim 1, wherein an arithmetical mean height Sa of a surface of the substrate is 0.1 to 0.5 μm, a maximum height Sz is 0.2 to 5 μm, and a mean width of roughness profile elements RSm is 0.5 to 10 μm.

3. The aluminum member according to claim 1, wherein a thickness of the first porous layer is 10 nm or more and 5000 nm or less.

4. The aluminum member according to claim 1, wherein the first porous layer has an average pore diameter larger than that of the second porous layer.

5. The aluminum member according to claim 1, wherein a average pore diameter of the second porous layer is 100 nm or less.

6. A method for producing an aluminum member according to claim 1, comprising:
performing a first anodization on a substrate formed of aluminum or an aluminum alloy, using an electrolytic solution that is capable of forming multiple pores aligned and extending linearly; and performing a second anodization on the substrate that has been subjected to the first anodization, using an electrolytic solution, wherein the electrolytic solution for the second anodization is capable of forming at least one of: multiple branching pores; or multiple pores having an average pore diameter larger than that of the multiple pores linearly extending.

7. The method for producing an aluminum member according to claim 5, wherein the electrolytic solution for the first anodization is an acidic electrolytic solution, and the electrolytic solution for the second anodization is an acidic or alkaline electrolytic solution.

8. The method for producing an aluminum member according to claim 5, further comprising:

performing roughening for forming irregularities on a surface of the substrate, wherein in the first anodization, the substrate on which the irregularities have been formed is subjected to the first anodization.

9. The method for producing an aluminum member according to claim 7, wherein in the roughening, particles having an average particle diameter of 20 μm or less are made to hit against the surface of the substrate to form the irregularities.

10. The method for producing an aluminum member according to claim 5, wherein the electrolytic solution for the first anodization contains at least one selected from the group consisting of sulfuric acid, amide sulfuric acid, and a compound having a carboxyl group.

11. The method for producing an aluminum member according to claim 5, wherein the electrolytic solution for the second anodization contains at least one selected from the group consisting of a compound having a carboxyl group, phosphoric acid, and each salt thereof.

12. The method for producing an aluminum member according to claim 5, wherein the electrolytic solution for the second anodization contains at least one selected from the group consisting of sodium, potassium, and ammonia.

* * * * *